United States Patent Office 2,777,821
Patented Jan. 15, 1957

2,777,821

ANTIFREEZE COMPOSITIONS CONTAINING TRICRESYL PHOSPHATE AS A FOAM INHIBITOR

Edward F. Harford, Wilmington, Del., assignor to E. I. du Pont de Nemours and Company, Wilmington, Del., a corporation of Delaware No Drawing. Application October 29, 1953,
Serial No. 389,165

2 Claims. (Cl. 252—78)

This invention relates to antifreeze compositions and specifically to non-foaming antifreeze mixtures containing ethylene glycol as the antifreeze ingredient, with borax as a corrosion inhibitor.

Borax has been employed successfully for many years as a corrosion inhibitor for methanol and ethylene glycol antifreeze compositions. Synergistic combinations of borax and mercaptobenzothiazole have also been employed on a large commercial scale for the same purpose. Ethylene glycol antifreeze containing borax as a corrosion inhibitor requires an anti-foaming agent, as does ethylene glycol inhibited with other known commercial antifreeze corrosion inhibitors, where avoidance of foaming is important. The most common anti-foaming agent employed in ethylene glycol antifreeze compositions are oily materials of low volatility. Petroleum oil anti-foaming agent (relatively non-volatile petroleum fraction), and other miscellaneous oily products, have certain deficiencies as ethylene glycol and antifreeze foam depressants. In particular, such oil is only moderately effective, and does not completely suppress foam formation. Since it does not prevent foaming it does not prevent the loss of antifreeze from an automobile radiator under all conditions of use.

The foaming tendencies of several brands of antifreeze compositions containing ethylene glycol, distilled water (50% by volume), a corrosion inhibitor, and oil as a foam depressant, as measured on samples taken in various years, varied somewhat but in all instances foaming of the antifreeze composition was sufficient to cause difficulty. The foaming tendency was determined by immersing into a constant temperature water bath, a one liter graduate containing a gas diffuser at the bottom cemented to a 7 mm. Pyrex glass tube, placing a 200 ml. sample in the graduate, and passing air into the tube at the rate of 4 cu. ft./hr. The level of the foam formed in 5 minutes was recorded, and the time required for this foam to disappear was also noted. The test gave the following results.

*Table 1.—Foaming of commercial ethylene glycol antifreeze compositions (containing oil as a depressant)*

| Antifreeze Composition | Ml. Foam + Unfoamed Liquid | | Break Time (sec.) | |
|---|---|---|---|---|
| | 75° F. | 140° F. | 75° F. | 140° F. |
| A | 370 | 270 | 4 | 2 |
| B | 295 | 660 | slow | slow |
| B | 310 | 920 | slow | 90 |
| B | 320 | 430 | 54 | 11 |
| C | 380 | 380 | 7 | 4 |
| D | 610 | 510 | 20 | 15 |

In comparison with the foregoing results, two brands of ethylene glycol antifreeze which contained no oil gave levels of foam exceeding 1000 ml. at each of the temperatures tested.

The foregoing table thus shows that the above-mentioned common foam suppressing oils have a definite anti-foaming quality in ethylene glycol antifreeze compositions, but that such materials do not completely prevent foam, and moreover the amount of foam-suppression achieved varies with the nature or identity of the ethylene glycol antifreeze composition. Moreover, the table also illustrates the fact that commercial ethylene glycol antifreeze compositions in general are only moderately good from the foaming standpoint.

Foam suppressants other than those hereinabove mentioned for anti-rust ethylene glycol antifreeze have been tried, and one of the most effective agents known heretofore for this purpose is a polysilicone commercial antifoaming agent which reduced the foam level in 50% aqueous ethylene glycol (containing 2.2% borax based on weight of glycol) in the test just described from 770 at 140° F., to 260 ml. at the same temperature, even when present to the extent of only 50 p. p. m. (0.005% by weight).

In searching for a substance which in aqueous ethylene glycol would have antifoaming properties comparable with those of the silicones, it was found that relatively little assistance could be gained through a consideration of currently known theories of antifoam action. The theoretical aspects of the selection of foam inhibitors have been discussed in an article by Robinson and Wood, J. S. C. I. 1948, 67, 361–5. Foam inhibitors, according to current theory, are substances which have low solubility in the medium to be inhibited, and which form globules therein which are capable of causing coalescence of adjacent submerged bubbles of air. To do this the globule must penetrate the air-liquid surface of the air bubble on contact and then spread over the foaming surface inside the bubble, whereupon the bubble collapses more or less explosively. The following requirements have been proposed by Robinson and Woods as criteria for a satisfactory emulsion type foam inhibitor: (1) the surface tension must be considerably lower than that of the foaming solution, (2) the solubility in the foaming solution must be low, and (3) the agent must be readily dispersible in the foaming solution. If the foam in question is agitated in a closed system, e. g. an automobile radiator, which is completely filled with the foamed liquid, the foam is generally of the emulsion type.

The requirements just described for substances having antifoam properties make it clear that additives which are good foam inhibitors in a particular medium, e. g. lubricating oil, cannot be expected to be good foam inhibitors in a different sort of medium, e. g. aqueous ethylene glycol. This is significant because the foam inhibitor employed in ethylene glycol antifreeze, according to the present invention, namely, tricresyl phosphate, is one which has been employed heretofore, as an antifoam for lubricating oil. Moreover, this particular antifoaming agent is somewhat soluble in ethylene glycol antifreeze in the form in which the antifreeze is commonly marketed, but is thrown out of solution in the form of tiny droplets, upon addition of water. This is quite important because for uniformity of results it is far better to employ a mixture which can be marketed in a homogeneous form, rather than as a heterogeneous mixture comprising an ethylene glycol layer and a hydrocarbon or other oily layer, e. g. lanolin, part or all of which can be lost in pouring.

The antifoaming effect of tricresyl phosphate in ethylene glycol antifreeze (containing about 2 to 3% of alkali metal borate, e. g. sodium metaborate or borax), after dilution with an equal volume of water, was outstanding, in tests wherein a very large number of antifoam candidates were studied by the method hereinabove described, as substitutes for the commercial silicone antifoam. The materials tested included a wide variety of substances, exemplified by mineral oil ("Primol"-D), colloidal silica, tributyl phosphate, morpholine acetate, morpholine oleate, dicyclopentadienyl iron, p-aminophenol, ethylene bis(iminoacetic acid), dibutylthiourea, dimethylol-N-methylpyrrole, hydroquinone monoethyl ether, methylisoquinoline, methyl chloroglucinol, potassium fluozirconate, sodium glycinate and about forty others which on the basis of the current theory should have an antifoaming action. In general these substances were somewhat effective but only a very few were good enough to reduce foaming tendency by more than 50%. The following table gives the results of the only compounds found which reduced foaming by about 50% or more at 140° F.

Table II.—*Outstanding foam inhibitors in borax-ethylene glycol antifreeze compositions*

| Foam Inhibitor | Concentration of Foam Inhibitor in 50% Aqueous Antifreeze, percent | Volume of unfoamed Liquid and Foam 190 ml. of Solution Tested, at 140° F. after 5 min. (ml.) |
|---|---|---|
| None (control) | | 770. |
| Tributyl phosphate | 0.16 | 410. |
| Tricresyl phosphate | 0.16 | No foam. |
| Do | 0.35 | Do. |
| Do | 0.005 | Do. |

In a practical car test an automobile radiator was charged with water to which was added an antifreeze composition made by admixing tricresyl phosphate with ethylene glycol and borax inhibitor (0.07% tricresyl phosphate, 2.2% borax, the remainder being ethylene glycol) prior to addition to water in the radiator. The radiator was equipped with a tank for collecting any liquid which foamed over during operation of the engine or when the engine was turned off, but virtually none was collected.

The data obtained in the experiments showed rather conclusively that tricresyl phosphate is, for some unknown reason, an extraordinarily efficient antifoam inhibitor in ethylene glycol-borax antifreeze solution. The quantity of tricresyl phosphate which can be used, as shown in the following table, need not exceed the solubility of tricresyl phosphate in ethylene glycol-borax mixture. For optimum results, the quantity of tricresyl phosphate is generally about 0.01 to 0.7% of the weight of glycol. The content of borax in the ethylene glycol antifreeze should be from 1 to 5% of the weight of the glycol preferably 2 to 3%. If a mercaptobenzothiazole co-inhibitor is used the quantity of such co-inhibitor should be from 1 to 10%, preferably 2 to 5%, of the weight of the borax.

The commercial antifreeze containing 2.2 to 2.5% borax can be inhibited very satisfactorily against foam formation by addition of 0.07% of tricresyl phosphate, based on the weight of ethylene glycol.

The quantity of water to be admixed with the ethylene glycol is the same as is commonly employed in the ethylene glycol antifreeze art to achieve the desired lowering of the freezing point of the engine coolant.

The tricresyl phosphate foam inhibitor is especially advantageous in combination with borax, not only because of the antifoaming property of the tricresyl phosphate, but also because of the desirable anticorrosion properties of the combination of tricresyl phosphate and borax in an ethylene glycol antifreeze.

The above-mentioned combination of inhibitors is preferably employed with substantially pure ethylene glycol, or aqueous solutions thereof; however, small amounts of other glycols such as propylene glycol may be included without serious disadvantage, when for economic reasons it is desirable to employ ethylene glycol which is mixed with such other glycol. Impurities which give rise to an acidity corresponding to a pH below 6.5 should of course be avoided, since such acidity in an antifreeze is generally accompanied by corrosion of the metals which come in contact with it when the antifreeze composition is used as internal combustion engine coolant.

I claim:

1. An antifreeze composition consisting of ethylene glycol having dissolved therein from 2 to 3% of borax and from 0.01 to 0.07% of tricresyl phosphate, based on the weight of glycol.

2. An antifreeze composition consisting of ethylene glycol having dissolved therein from 2.2 to 2.5% of borax and 0.07% of tricresyl phosphate.

References Cited in the file of this patent

UNITED STATES PATENTS

| | | |
|---|---|---|
| 2,249,800 | Weber | July 22, 1941 |
| 2,407,589 | Tremain et al. | Sept. 10, 1946 |
| 2,462,694 | Walker | Feb. 22, 1949 |
| 2,534,030 | Keller | Dec. 12, 1950 |